(12) United States Patent
Lo et al.

(10) Patent No.: US 6,178,540 B1
(45) Date of Patent: Jan. 23, 2001

(54) PROFILE DESIGN FOR WIRE BONDING

(75) Inventors: Yu-Lung Lo, Taipei; Tien-Lou Ho, Taichung Hsien; Jau-Liang Chen, Taichung; Sheng-Lung Wu, Taoyuan Hsien, all of (TW)

(73) Assignee: Industrial Technology Research Institute, Hsinchu (TW)

( * ) Notice: Under 35 U.S.C. 154(b), the term of this patent shall be extended for 0 days.

(21) Appl. No.: 09/038,003

(22) Filed: Mar. 11, 1998

(51) Int. Cl.$^7$ ................................................ H01L 21/60
(52) U.S. Cl. ........................................................... 716/15
(58) Field of Search ............................ 228/102; 428/210

(56) References Cited

U.S. PATENT DOCUMENTS

| | | | |
|---|---|---|---|
| 4,932,584 | 6/1990 | Yamazaki et al. | 228/180.5 |
| 5,205,463 | * 4/1993 | Holdgrafer | 228/102 |

* cited by examiner

*Primary Examiner*—Paul R. Lintz
*Assistant Examiner*—Thuan Do
(74) *Attorney, Agent, or Firm*—Pillsbury Madison & Sutro LLP

(57) ABSTRACT

A method of linkage with springs mold is provided to simulate the condition of forces acting on a bonding wire for semiconductor package. The bonding wire profile can be formed by means of combining several sets of linkage with springs, wherein the coefficients of elasticity and plasticity of the springs are determined by the bending angle of two linkages which simulates the elastic-plastic deformation of the wires. The operational model can be simplified and the time can be saved by using the multiple degrees of freedom of the links/springs to analyze the profile and forces on the fine wire. Necking and fracture during formation process of the bonding wire can be avoided by the present method and design to achieve the optimum design for wire bonding profiles.

3 Claims, 8 Drawing Sheets

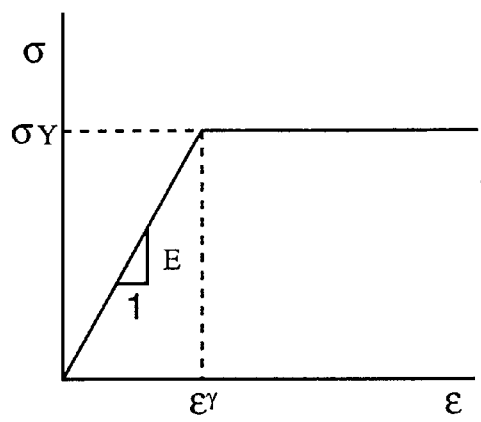 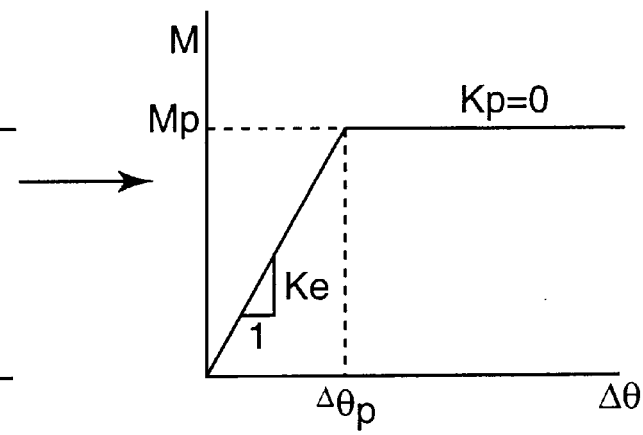
FIG. 6(a)　　　　　FIG. 6(b)
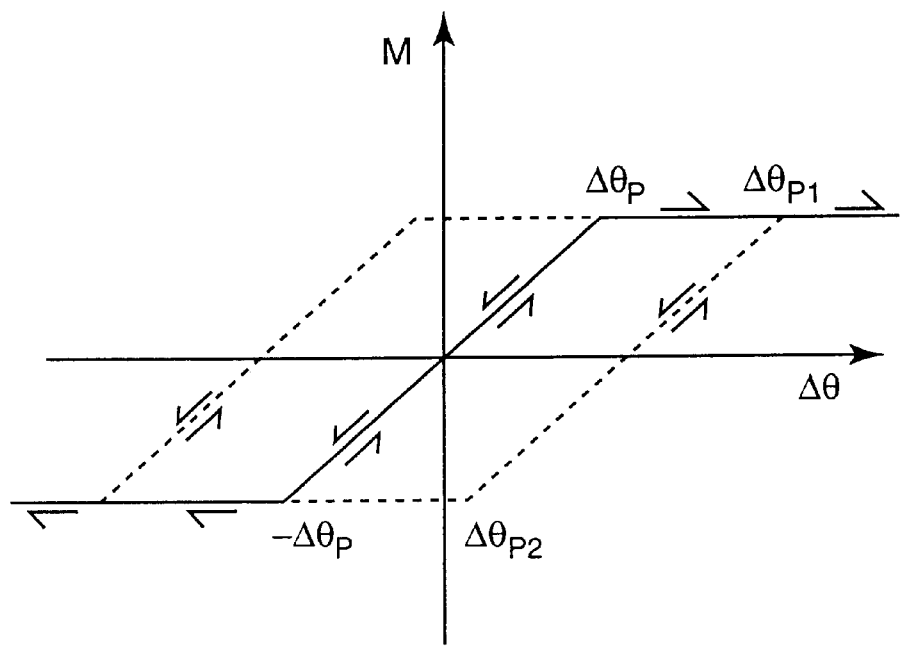
FIG. 7

PROFILE DESIGN FOR WIRE BONDING

BACKGROUND OF THE INVENTION

1. Field of the Invention

The present invention relates to a wire bonding formation for semiconductor industry, and more particularly to a profile design for wire bonding to prevent the wire from necking and fracture in the process of bonding, thereby providing an optimum design for wire bonding profiles in package fabrication technologies for semiconductors.

2. Description of the Related Art

The semiconductor package provides electrical connection and mechanical and environmental protection for the semiconductors. Cost and/or performance considerations of the packaged device usually dictate the assembly and packaging details. Packaging significantly affects, and in many instances dominates, the overall cost, performance, and reliability of the packaged die. Packaging is now receiving more attention by both packaged-device venders and system builders. Recently, developments of the package fabrication technologies in the semiconductor industry are significant, and a trend thereof is thin, fine and small such that qualitative and quantitative analysis in the bonding track of the wire become extremely important as the result of the analysis may provide effective, valuable information to avoid necking and/or fracture for the bonded wire during packaging process. It is therefore an issue of research and development in the semiconductor industry to analyze and simulate how forces acting on the fine wire interconnection during the bonding formation and to construct an optimal profile by means of simulating a simple model for the fine wire interconnection. U.S. Pat. No. 4,932,384 to Yamazaki et al. and U.S. Pat. No. 5,205,463 to Holdgrafer et al. proposed several wire bonding traces/loops to avoid necking and fracture in the wire bonding process. Currently, analysis of the formation process of the bonding wire is usually based on experimental statistics which is time-consuming and unable to use quantitative analysis and is subjected to complexity of conventional finite element method for elastic-plastic large deformation analysis of metal. Therefore, the finite element method for elastic-plastic large deformation analysis of metal is not found in domestic and foreign references for quantitative analysis of wire bonding technologies. Simulation of the wire bonding is either concerned with commercial secret or difficult to be analyzed quantitatively, and it would be of great aid in subsequent development of the wire bonding technologies if the relevant technique is controlled.

The present invention provides a method of linkage with springs to simulate the condition of forces-acting on a section of the bonding wire, and the bonding wire profile can be formed by means of combining several sets of linkage with springs, wherein the coefficients of elasticity of the springs are determined by the bending angle of two linkages which simulates the elastic-plastic deformation of the linkages. The operational model can be simplified and the time can be saved by using the multiple degrees of freedom of the links/springs to analyze the profile of and forces on the fine wire. Necking and fracture during formation process of the bonding wire can be avoided by the present method and design to achieve the optimum design for wire bonding profiles.

SUMMARY OF THE INVENTION

It is an object of the present invention to provide an novel method for analyzing the bonding profiles of the fine wires of semiconductor packages to qualitatively and quantitatively analyze the forces acting on the fine wire during the formation process. The present invention is different from the conventional analysis of experimental statistics and numerical analysis of the finite element method for elastic-plastic large deformation analysis of the fine wires. The result of the present method can be expanded to the wire bonding application field and the research field of the wire trajectory and semiconductor package technologies. The results of the invention include: (1) set-up of parameters for profile designs, (2) completion of simulating trajectory for wire bonding, and (3) developing of commercial software. The simulating method in accordance with the present invention provides a novel method to analyze the elastic-plastic of metallic bonding wire to expand the research field of the formation of wire bonding machines and related technologies.

Other objects, advantages, and novel features of the invention will become more apparent from the following detailed description when taken in conjunction with the accompanying drawings.

BRIEF DESCRIPTION OF THE DRAWINGS

FIG. 5a is a stress-strain diagram of a material property (which is hardened);

FIG. 5b is a moment-angle diagram converted from FIG. 5a;

FIG. 6a is a stress-strain diagram of a material property (full elastic-plastic);

FIG. 6b is a moment-angle diagram converted from FIG. 6a;

FIG. 7 is a spring simulation of elastic-plastic deformation of a material;

DESCRIPTION OF THE PREFERRED EMBODIMENTS

A new trend for formation of fine wire trace for semiconductor package technologies is low loop height, long loop length, high bonding speed, high density of wire bonding, and small sweep during wire molding. In order to simplify the elastic-plastic large deformation analysis on the fine wire trace and to build a reliable model for qualitative and quantitative analysis, the present invention provides a linkage with springs model to simulate formation of the fine wire trace.

Basic Assumption of the Linkage with Springs Model for the Fine Wire

During analysis of elastic-plastic large deformation analysis of the fine wire trace, in order to simplify the simulation of the linkage with springs model, there are assumptions as follows:

(1) The large deformation of the fine wire is limited in two-dimension.

(2) In the large deformation of the fine wire, as the wire has the property of high length/thickness ratio, the bending deformation is the main factor in deformation. Accordingly, it is assumed that the fine wire is segmented by several rigid bars. Under this assumption, the axial deformation of the fine wire can be ignored.

(3) The elastic-plasticity of the fine wire which may be changed responsive to different strain rates during high speed formation and thus the elastic-plasticity can be modified by the spring coefficient.

(4) As the fine wire has a relatively high length/thickness ratio, the inertia force resulted from mass acceleration can be ignored during high speed fine wire bonding. Thus, the key point is the analysis of static balance to simplify the analysis.

(5) Under the consideration of no loss of mechanical energy and pure elastic deformation (an ideal assumption), the pure elastic deformation of the fine wire under conservative force fields is assumed as path-independent of the formed traces.

(6) When the elastic-plastic deformation is taken into consideration, the elastic-plastic deformation is path-dependent on the formed trace as the loss of mechanical energy of the elastic-plastic deformation is not conservative.

Set-up of Simple Linkage with Springs Model

Figure 1:
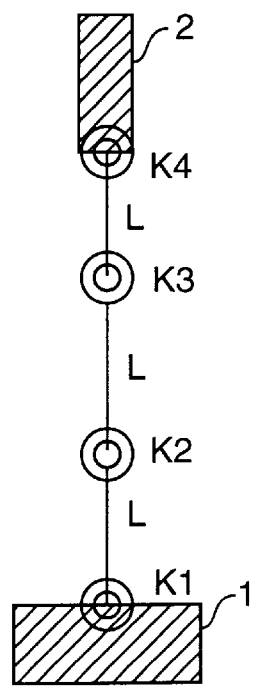
FIG. 1 is a schematic diagram of a simple model simulated by a linkage with springs in accordance with the present invention.
Figure 2:
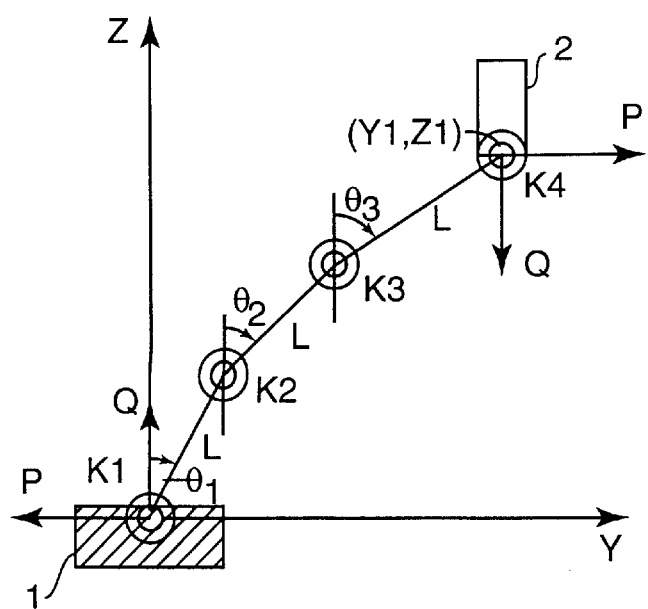
FIG. 2 is a schematic view illustrating the force diagram when a steel clamp is moved to a point (Y1, Z1)

As the loss of the mechanical energy during the elastic-plasfic deformation leads the final formed shape of the fine wire to be path-dependent from the trace, the spring simulating the fine wire should posses the characteristics of elastic-plastic change. As shown in FIG. 1, the fine wire is segmented into three sections each having a length "L", and four elastic-plastic springs are respectively connected between a base 1 and a lowermost section, the lowermost section and a middle section, the middle section and an uppermost section, and the uppermost section and a steel clamp, and respectively have a spring constant of K1, K2, K3 and K4. When the steel clamp 2 is moved to a point (Y1, Z1), in a coordinate relative to the first bond (0,0) the deformation of the fine wire and the force diagram of the base 1 and the steel clamp 2 acting on the wire are illustrated in FIG. 2.

Two independent equations can be obtained from the boundary condition of the position (Y1, Z1), and a momentum balance equation can be obtained from each rigid bar. Accordingly, there are five independent equations in total as follows:

$L \cos \theta_1 + L \cos \theta_2 + L \cos \theta_3 = Z1$;

$L \sin \theta_1 + L \sin \theta_2 + L \sin \theta_3 = Y1$;

$QL \sin \theta_1 + PL \cos \theta_1 + M_2 - M_1 = 0$;

$QL \sin \theta_2 + PL \cos \theta_2 + M_3 - M_2 = 0$;

$QL \sin \theta_1 + PL \cos \theta_1 + M_4 - M_3 = 0$; (1)

wherein $M_i = K_i \Delta \theta_i = K_i (\theta_i - \theta_{i-1})$ for $i = 1, 2, \ldots, 4$; $\theta_0 = \theta_4 = 0$;

Similarly, the fine wire can be segmented into N sections, each having a length L, and a spring constant of K1, K2, K3, ... Kn, respectively. Analyzing the movement of the steel clamp 2 to a point (Y1, Z1) may obtain the following N+2 equations:

$L \cos \theta_1 + L \cos \theta_2 + . +L \cos \theta_N = Z1$;

$L \sin \theta_1 + L \sin \theta_2 + . . +L \sin \theta_N = Y1$;

$QL \sin \theta_i + PL \cos \theta_i + M_{i+1} - M_i = 0$ for $i = 1, 2, \ldots, N$; (2)

wherein $M_i(\theta_i, \theta_{i-1}) = K_i \Delta \theta_i = K_i (\theta_i - \theta_{i-1})$ for $i = 1, 2, \ldots, N+1$; $\theta_0 = \theta_{N+1} = 0$ If L, K1, K2, K3, ... Kn are given, and the position (Y1, Z1) of the steel clamp 2 is a given with a boundary condition, there are N+2 unknown factors (P, Q, $\Theta$1, $\Theta$2, ... $\Theta$n) to be solved. Thus, N+2 solutions can be obtained by Newton's numerical analysis method.

Simulation of Elasticity of the Fine Wire Material

Figure 3:
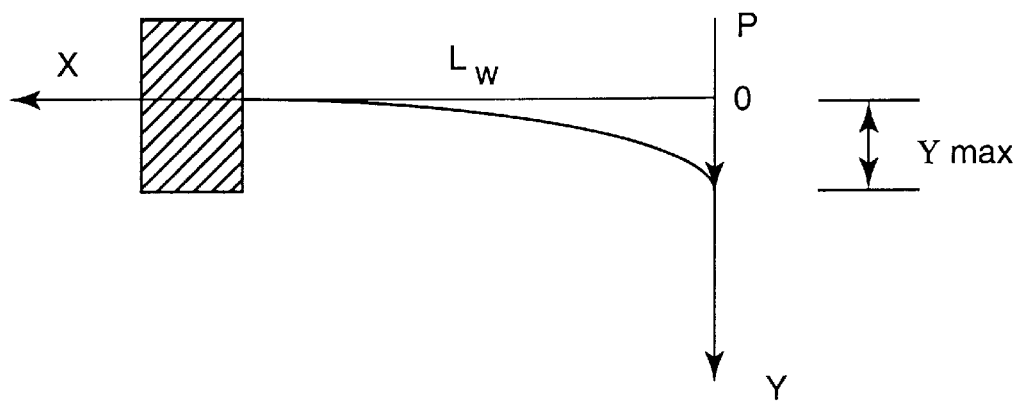
FIG. 3 is a schematic force diagram of a cantilever beam.

Considering a cantilever beam, as shown in FIG. 3, the end point is subjected to a force P. Assuming the deformation is relatively small, analysis of the elasticity can be done by means of comparison between an actual model and a simple linkage with springs model.

In the actual model considering small deformation, the deformation can be expressed as follows:

$$Y = \frac{P}{6EI}(X^3 - 3L_w^2 X + 2L_w^3);$$ (3)

wherein Y is the deformation along the Y direction, E is the Young's Modulus, I is an area secondary momentum, X is the distance to point O along the X direction, and Lw is the length of the fine wire. Therefore, the maximum deformation of the end point can be expressed as follows:

$$Y_{max} = \frac{PL_w^3}{3EI}.$$ (4)

Figure 4:
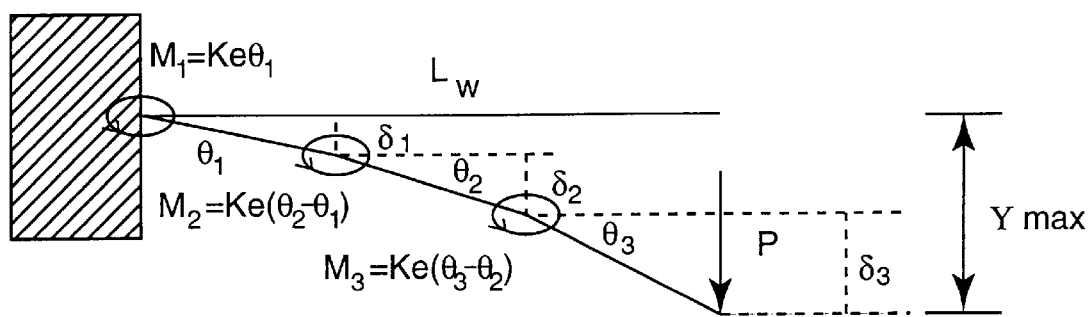
FIG. 4 is a schematic diagram of a cantilever beam considered as linkages with springs.

In this linkage with springs model, as shown in FIG. 4, the fine wire is segmented into N sections, each section being rigid and interconnected by a spring having a spring constant of Ke. Accordingly, the deformation of the end point of the fine wire can be expressed as follows:

$$Y_{max} = \frac{PL_w^2}{K_e} \times \frac{1}{N^2} \times \frac{N(N+1)(2N+1)}{6};$$ (5)

Thus, the relationship between Ke and E can be obtained from equations (4) and (5) and expressed as follows:

$$K_e = \frac{(N+1)(2N+1)}{2N} \frac{EI}{L_w}.$$ (6)

From equation (6), it is known that the value of Ke is in direct proportion to the Young's Modulus of the fine wire material E and the area secondary momentum I and is in inverse proportion to the length Lw of the fine wire. Accordingly, the value of Ke of this model is a constant in the simulation of elasticity, when the N, I, and Lw are given.

Plastic Simulation of the Fine Wire Material

Figures 5A, 5B:
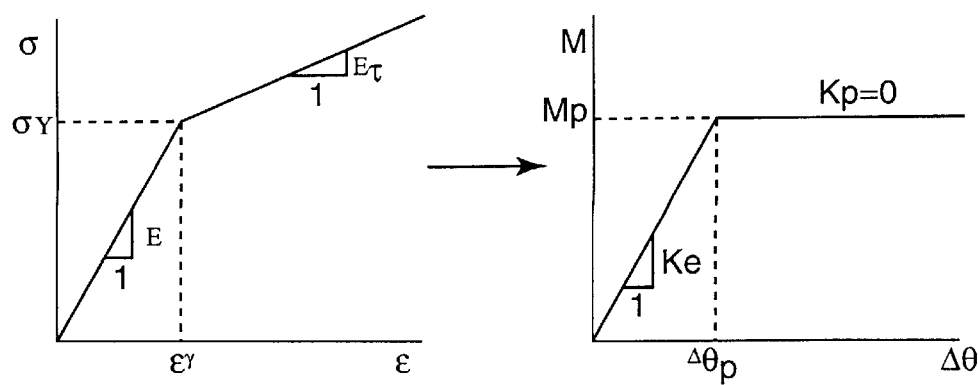

FIG. 5a and FIG. 5b illustrates how a stress-strain ($\sigma$–$\epsilon$) diagram of the fine wire material is converted to a moment-angle (M–$\Delta\Theta$) diagram and how the relationship between the yielding point and the maximum deformation of bending angle is built up.

In a full elastic-plastic model (see FIGS. 6a and 6b), when not considering the axial stress and shear stress, the limit bending momentum based on the pure bending theory can be expressed as follows:

$$M_P = \frac{4}{3} r^3 \sigma_Y; \quad (7)$$

wherein Mp is the limit bending momentum, r is the radius of the circular section of the fine wire, and $\sigma_Y$ is the yielding stress. If hardening process is taken into consideration, the above equation can be corrected as follows:

$$M_P = \frac{4}{3} r^3 \sigma_Y \times \alpha; \quad (8)$$

wherein $\alpha$ is the correction factor and is correlated with the Modulus of tangential elasticity $E_T$. Assuming $\alpha$ is of a reasonable value, e.g., 1.15, it represents the limit bending momentum during hardening process, which is greater than that of the full elastic-plastic theory by 15%. An equation can be obtained from FIG. 5b:

$$\Delta\theta_p = \frac{M_P}{K_e} \quad (9)$$

wherein $\Delta\Theta_p$ and Mp respectively represent the angular difference between the two links and the momentum value of the spring. The relationship between the i-th spring bending moment Mi and $\Delta\Theta_p$ can be obtained form equations (8), and (9):

$$M_i = \begin{cases} K_e(\theta_i - \theta_{i-1}) & \text{when } \Delta\theta_i \le |\Delta\theta_p| \\ M_P & \text{when } \Delta\theta_i > \Delta\theta_p \\ -M_P & \text{when } \Delta\theta_i < -\Delta\theta_p \end{cases} \quad (10)$$

wherein Mi is the moment value of the i-th spring; $\Theta_i$ and $\Theta_i$-1 respectively represent the angles between the two ends of the i-th link and the vertical direction. If the recovery of the spring after the plastic deformation is considered, the above equation is corrected as follows:

$$M_i = \begin{cases} K_e(\theta_i - \theta_{i-1}) - K_e(\Delta\theta_{p1} - \Delta\theta_p) & \text{when } \Delta\theta_{p2} \le \Delta\theta_i \le \Delta\theta_{p1} \\ M_P & \text{when } \Delta\theta_i > \Delta\theta_{p1} \\ -M_P & \text{when } \Delta\theta_i < \Delta\theta_{p2} \end{cases} \quad (11)$$

wherein $\Delta\Theta_{p1}$ and $\Delta\Theta_{p2}$ are limit bending angles of the recovered springs under plastic deformation, illustrated in FIG. 7.

Experimental Verification

Figure 8:
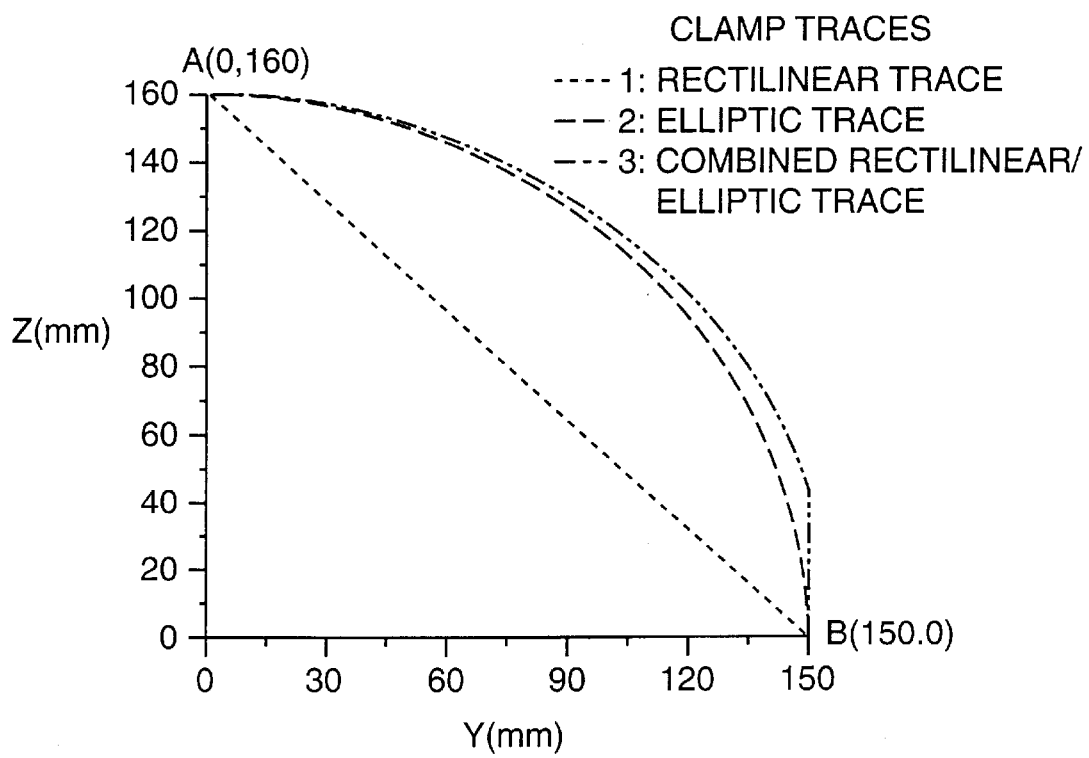
FIG. 8 is a diagram of moving traces of the steel clamp.

A simple test can be done on a thin straight copper wire to verify the accuracy of the simple linkage with springs model. Two ends of the thin straight copper wire having a diameter of 0.36 mm and a length of 180 mm are tightly clamped by two clamps respectively such that the length of the copper wire between the two clamps are controlled to be 160 mm. One of the clamps is fixed, while the other is moved from a point A (0,160 mm) to a point B (150 mm, 0) along three different traces, i.e., a rectilinear trace, an elliptic trace, and a combined rectilinear/elliptic trace, as shown in FIG. 8. The formed curve of the copper wire of different traces may be analyzed by means of substituting the parameter values (see Table 1) of the copper wire into the equations and based on the given coordinates of the clamps and the three different paths.

TABLE 1

| Parameter | Length | diameter | Young's Modulus | Yielding Strength |
|---|---|---|---|---|
| Value | 160 mm | 0.36 mm | E = 120 Gpa | $\sigma_Y$ = 330 Mpa |

Figure 9:
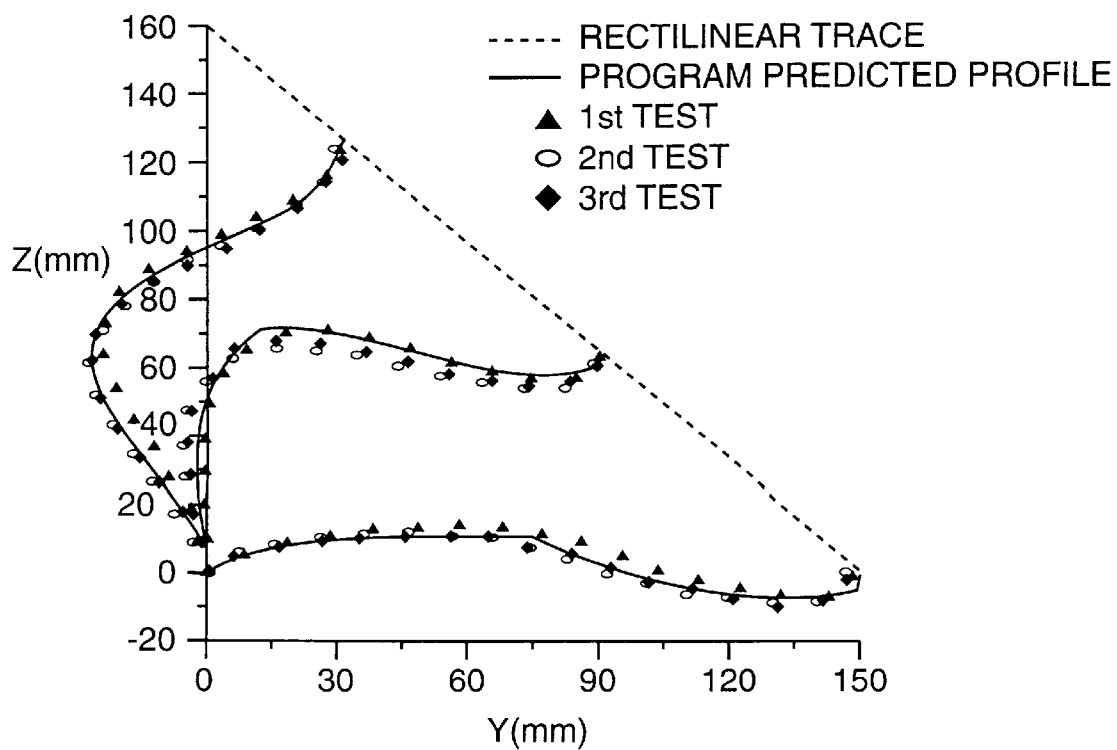
FIG. 9 is a diagram illustrating formation of a rectilinear trace.
Figure 10:
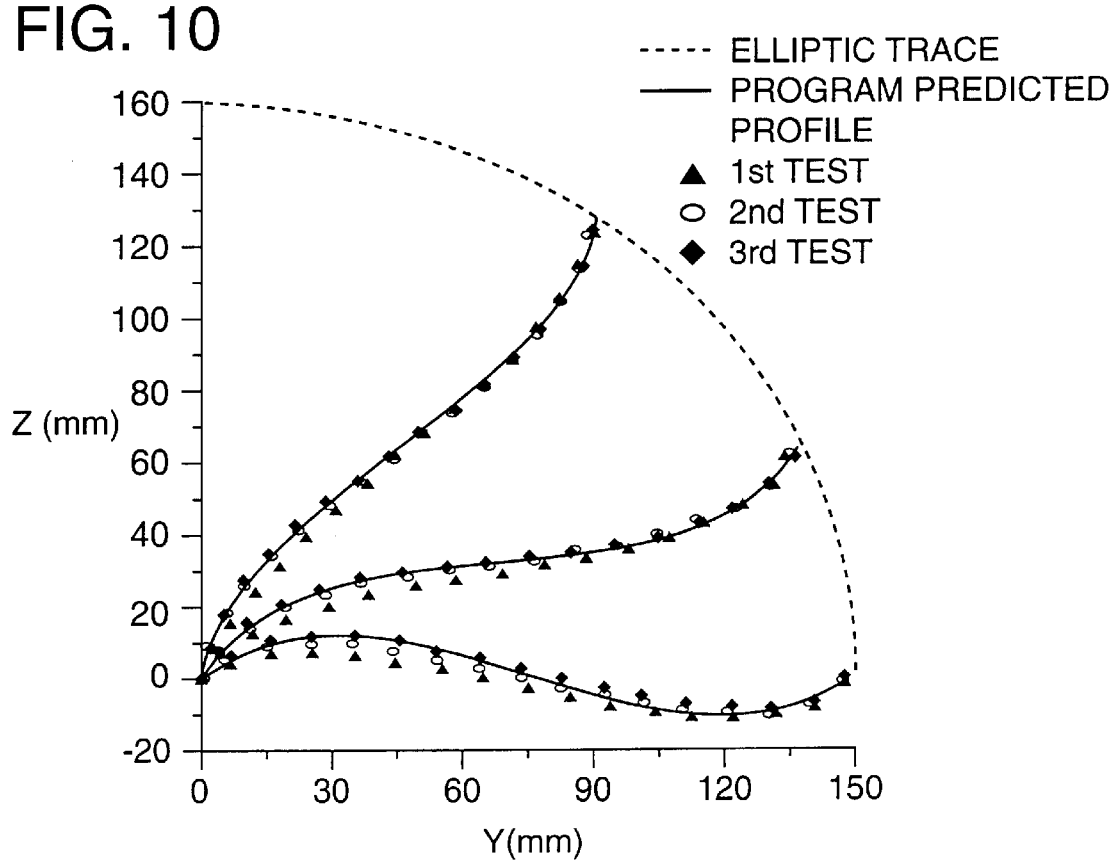
FIG. 10 is a diagram illustrating formation of an elliptical trace.
Figure 11:
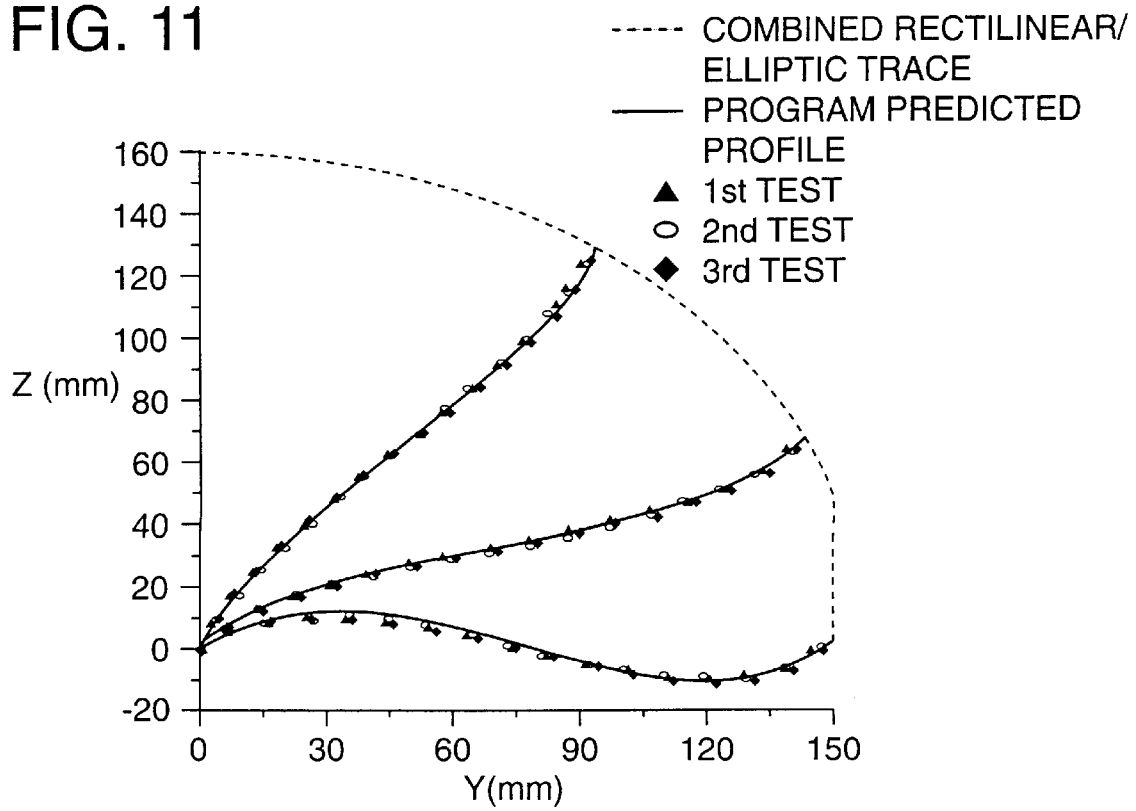
FIG. 11 is a diagram illustrating formation of a combined rectilinear/elliptical trace.

Formation of the three traces in the tests are recorded and diagrams are made thereupon to provide a comparison with the formed curve obtained from analyzing the model. FIG. 9 illustrates the result of the comparison between three tests and the analysis along the rectilinear trace. FIG. 10 illustrates the comparison between three tests and the analysis along the elliptic trace. FIG. 11 illustrates the comparison between three tests and the analysis along the combined rectilinear/elliptic trace. As can be seen in FIGS. 9 to 11, the analysis frame of the invention may dominate the main formation of the traces of the copper wire, and the errors thereof may be concluded as follows: (1) simplification of the analytical model, (2) deviation resulting from the simple tests, (3) fixing of the clamps. The following description will discuss more complicated formation in the traces of the simple analytical model.

Build-Up of the Analyzing Model

Figures 12A, 12B, 12C:
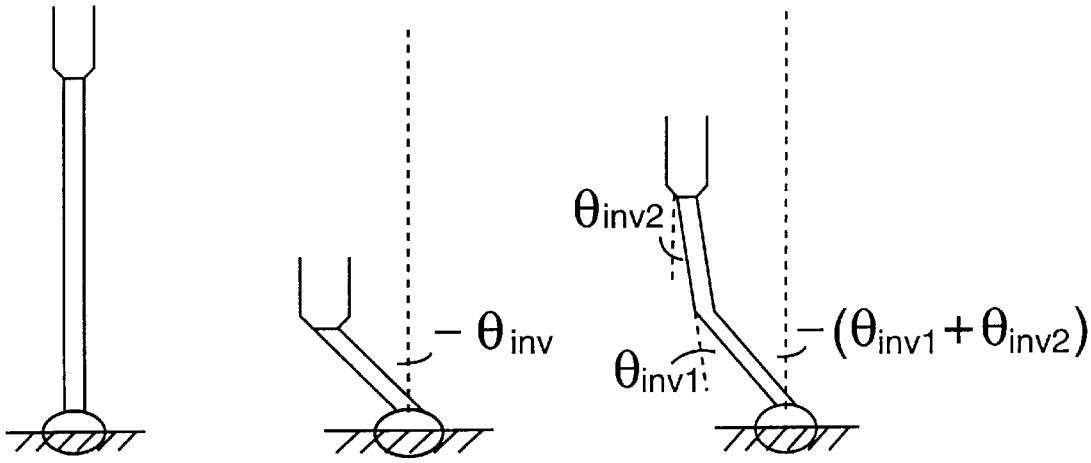
FIG. 12a, 12b, and 12c illustrate simulating models of the wire bonding formation with different preformings.

After verification by simple tests, analysis of complicated formation of the fine wire based on different initial conditions (i.e., different preformings) will be proceeded to analyze the following three different cases:

(1) Primary type (see FIG. 12a): the steel clamp is directly lifted to the highest point and is moved to the second bond along a pre-set trace, therefore, the initial condition is that each spring is not deformed.

(2) Two-plastic type (See FIG. 12b): the steel clamp is firstly lifted to a higher level and then moved in a reverse direction (which is defined as "inverse angle" $\Theta_{inv}$) and then lifted to the highest point so as to be moved to the second bond along a pre-set trace. Assuming it is the i-th spring where the inverse angle is formed, the initial condition is that the first spring has a plastic preforming of $\Theta_{inv}$, the i-th spring has a plastic preforming of $\Theta_{inv}$, and the remaining springs are elastically deformed.

(3) Three-plastic type (see FIG. 12c): the steel clamp is firstly lifted to a higher level and then moved in a reverse direction (which is defined as "inverse angle" $\Theta_{inv1}$) and then again lifted to a further higher level and then again moved in the reverse direction (which is defined as "inverse angle" $\Theta_{inv2}$) and finally lifted to the highest point so as to be moved to the second bond along a pre-set trace. Assuming it is the i-th spring where the inverse angle $\Theta_{inv1}$ is formed and the j-th spring is the place where the inverse angle $\Theta_{inv2}$ is formed, the initial condition is that the first spring has a plastic preforming of ($\Theta_{inv1}$+$\Theta_{inv2}$), the i-th spring is has a plastic preforming of $\Theta_{inv1}$, the j-th spring is has a plastic preforming of $\Theta_{inv2}$, and the remaining springs are elastic deformed.

Analysis Result of Primary Type

Figure 13:
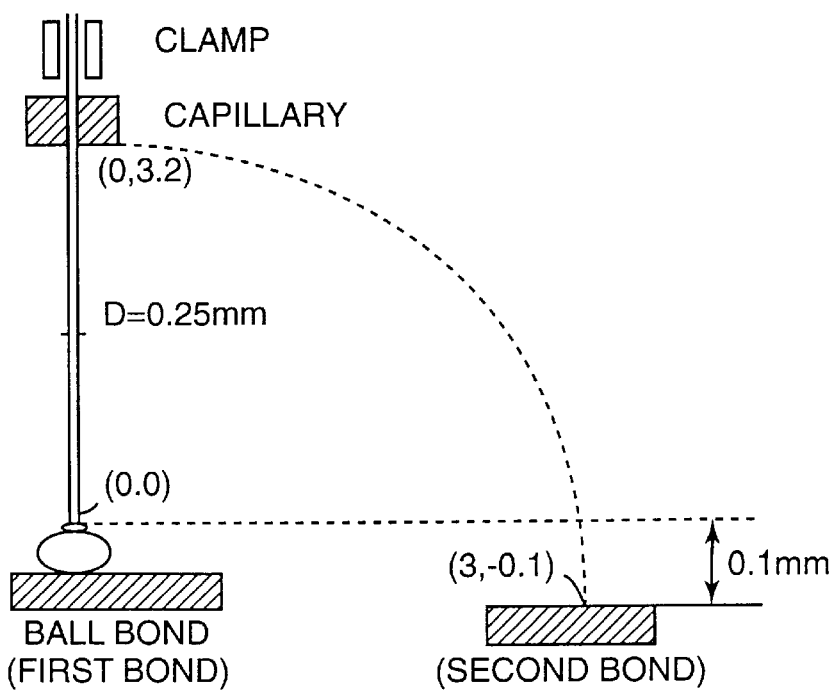
FIG. 13 is a schematic diagram illustrating formation process of the fine wire.

The length Lw of the fine wire is assumed to be 3.2 mm, and is moved from point (0,3.2) to point (3.0, −0.1), as shown in FIG. 13.

Figure 14:
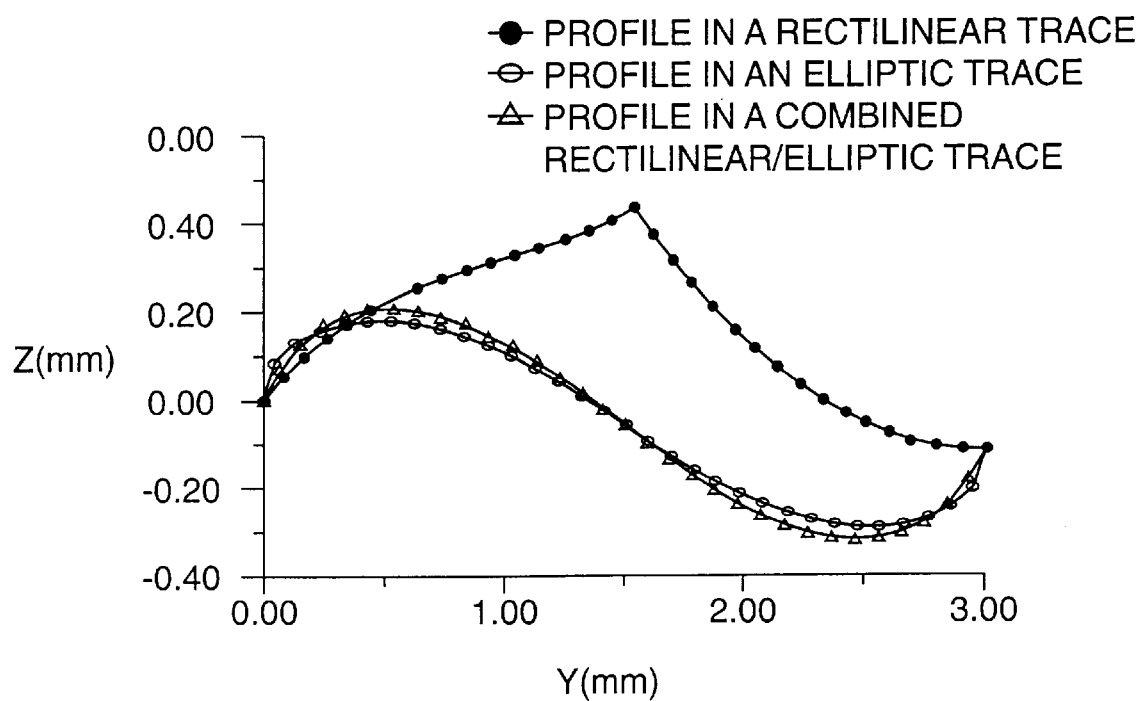
FIG. 14 is a diagram illustrating three different profiles of the fine wire in three different traces.

The trace can be chosen from the above-mentioned three traces (i.e., rectilinear, elliptic, and combined rectilinear/elliptic), and the above-mentioned simple model can be used for analysis. FIG. 14 illustrates the differences between formed fine wires respectively along the different traces from point (0, 3.4) to point (3.0, −0.1). As can be seen from this figure, the trace along the rectilinear track is quite different from those along the elliptic trace and the combined rectilinear/elliptic trace, which means that the formed fine wire of the rectilinear trace has a relatively large plastic deformation. In addition, the elliptic trace is also different from the combined rectilinear/elliptic trace, which means that when analyzing with the elastic-plastic model, the variation of the shape of the fine wire is concerned not only with the positions but also with the traces of the clamps, which matches with the characteristics of actual fine wire deformation.

Analysis Results of Two-plastic and Three-plastic Types of Preformings

Figure 15:
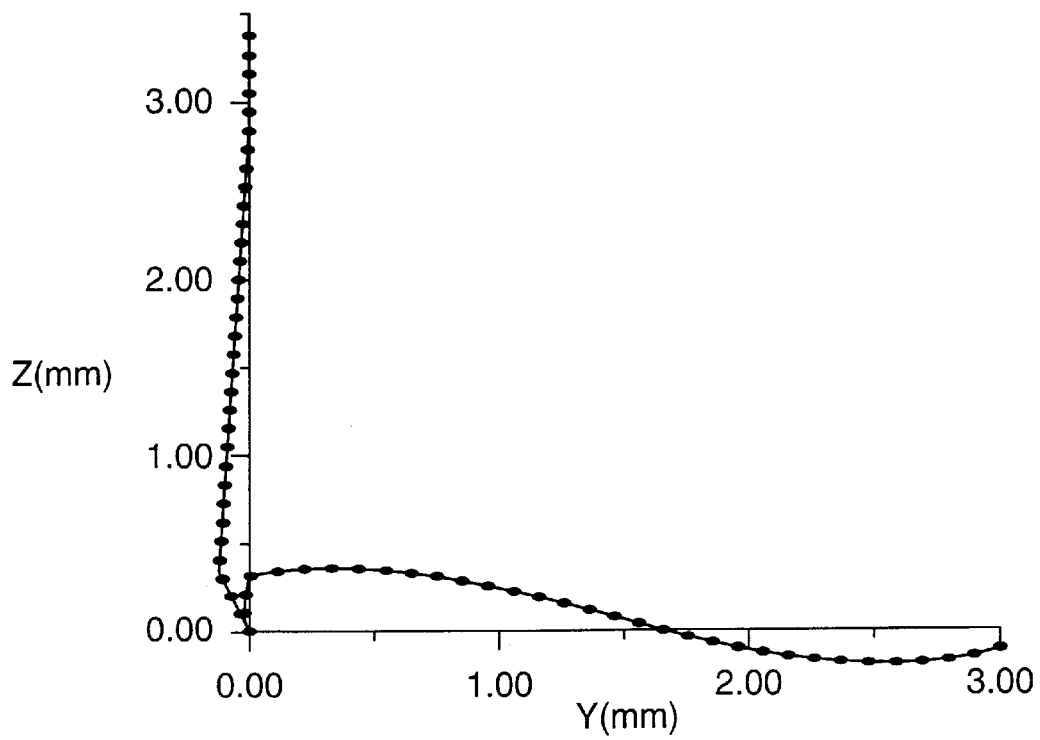
FIG. 15 is a diagram illustrating formation of a two-plastic type of preforming.
Figure 16:
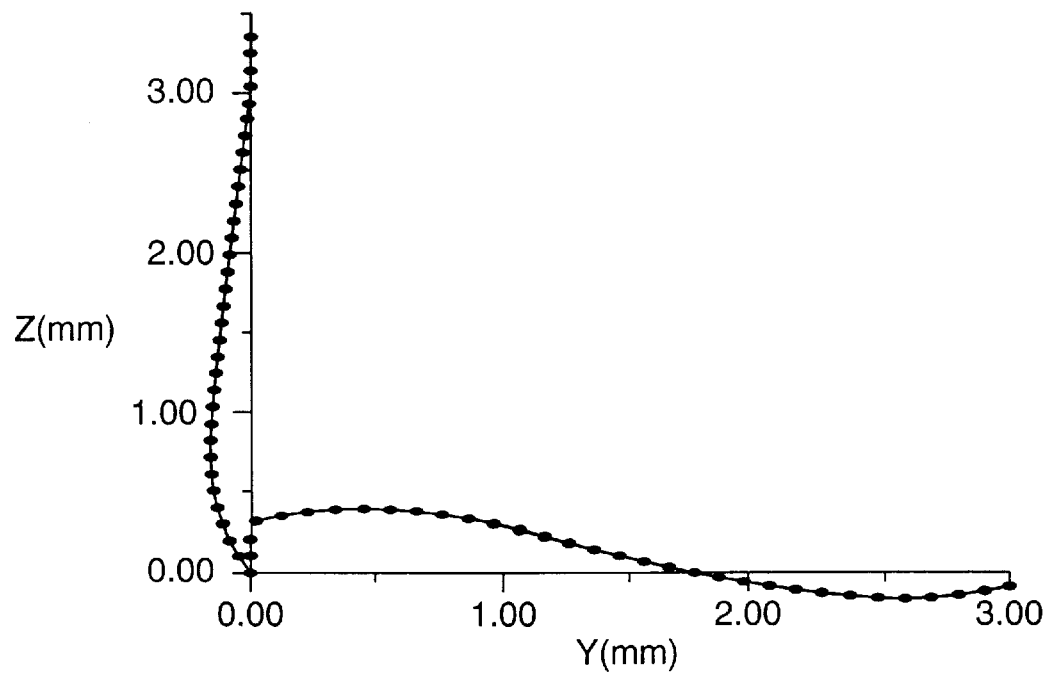
FIG. 16 is a diagram illustrating formation of a three-plastic type of preforming.

FIG. 15 illustrates an analysis of the elliptic trace of the fine wire which has a length Lw of 3.4 mm and a diameter D of 0.025 μm and is segmented into 32 sections, wherein the first point and the fourth point have pre-plastic deformations, while the inverse angle $\Theta_{inv}=0.5$ rad. FIG. 16 illustrates an analysis of the elliptic track of a fine wire which has a length Lw of 3.4 mm and a diameter D of 0.025 μm and is segmented into 32 sections, wherein the first point, the fourth point, and the eighth point have pre-plastic deformations, while the inverse angle $\Theta_{inv1}=0.3$ rad and the inverse angle $\Theta_{inv2}=0.2$ rad. According to the result of analysis, the preforming processes of the two-plastic type and the three-plastic type may eliminate the deficiency of the downward bending of the second bond and lower the height of the formed fine wire, which is the same as those achieved by the above-mentioned U.S. Pat. Nos. 4,932,384 and 5,205,463.

Industrial Utility of the Invention

The trace of the bonding wire can be formed by combinations of several links and springs, and the coefficients of the springs are determined by using the bending angles of two links which simulates the elastic-plastic of the bonding wires. By means of using the linkage with springs model with multiple degrees of freedom to simulate the trace of the force on the fine wire, the operation model is simplified and the time is saved. This design may avoid necking and fracture of the bonding wire during the formation thereby providing an optimum design for wire bonding profiles in package fabrication technologies for semiconductors.

Although the invention has been explained in relation to its preferred embodiments, it is to be understood that many other possible modifications and variations can be made without departing from the spirit and scope of the invention as hereinafter claimed.

We claim:

1. A method for analyzing forces acting on a wire during a formation process in which the wire is connected between a first bond and a second bond of a semiconductor device, wherein the second bond has a coordinate (Y1, Z1) relative to the first bond (0,0), comprising:

(1) designating N sections of the wire each having a length L and respectively having an elastic constant of K1, K2 . . . Kn;

(2) simulating the trace of a force (P, Q) of a clamp acting on the wire and analyzing deformation $\theta_i$ of the wire moved from the first bond to the second bond and the force (P, Q) of the clamp acting thereon from the following equations which are based on a linkage with springs model:

$$L \cos \theta_1 + L \cos \theta_2 + \ldots L \cos \theta_N = Z1;$$

$$L \sin \theta_1 + L \sin \theta_2 + \ldots L \sin \theta_N = Y1;$$

$$QL \sin \theta_i + PL \cos \theta_i + M_{i+1} - M_i = 0 \text{ for } i=1,2,\ldots,N;$$

$$M_i = K_e(\theta_i - \theta_{i-1}) - k_e(\Delta\theta_{p1} - \Delta\theta_p) \text{ when } \Delta\theta_{p2} \leq \Delta\theta_i \leq \Delta\theta_{p1};$$

$$M_i = M_p \text{ when } \Delta\theta_i > \Delta\theta_{p1};$$

$$M_i = -M_p \text{ when } \Delta\theta_i < \Delta\theta_{p2};$$

wherein $\theta_1 \ldots \theta_N$ are deformations at each end of the linkages, $M_i$ is the bending moment value of the i-th spring, $K_e$ is the spring constant in the simulation of elasticity, $M_p$ is the limit bending momentum, $\Delta\theta_p$ is the angular difference between two linkages, and $\Delta\theta_{p1}$ and $\theta_{p2}$ are limit bending angles of recovered springs which are plastically re-deformed; and (3) calculating the deformation $\theta_i$ and the force (P,Q) of each said section of the wire such that necking and fracture of the wire during the formation process can be avoided thereby providing an optimum design for wire bonding profiles.

2. The method according to claim 1, wherein the deformation $\Theta_i$ and the force (P, Q) are calculated by numerical analysis method.

3. The method according to claim 2, wherein the deformation $\Theta_i$ and the force (P, Q) are calculated by Newton's numerical analysis method.

* * * * *